W. H. SHIMPF.
STARTING MOTOR AND COMPRESSOR.
APPLICATION FILED NOV. 4, 1912.

1,120,337.

Patented Dec. 8, 1914.

4 SHEETS—SHEET 1.

Attest:

Inventor:
Walter H. Shimpf
by
Atty

W. H. SHIMPF.
STARTING MOTOR AND COMPRESSOR.
APPLICATION FILED NOV. 4, 1912.

1,120,337.

Patented Dec. 8, 1914.

4 SHEETS—SHEET 2.

Attest:
E. D. Mitchler
R. te Brenner

Inventor:
Walter H. Shimpf
by H. H. Backer
Atty

W. H. SHIMPF.
STARTING MOTOR AND COMPRESSOR.
APPLICATION FILED NOV. 4, 1912.
1,120,337.
Patented Dec. 8, 1914.
4 SHEETS—SHEET 3.
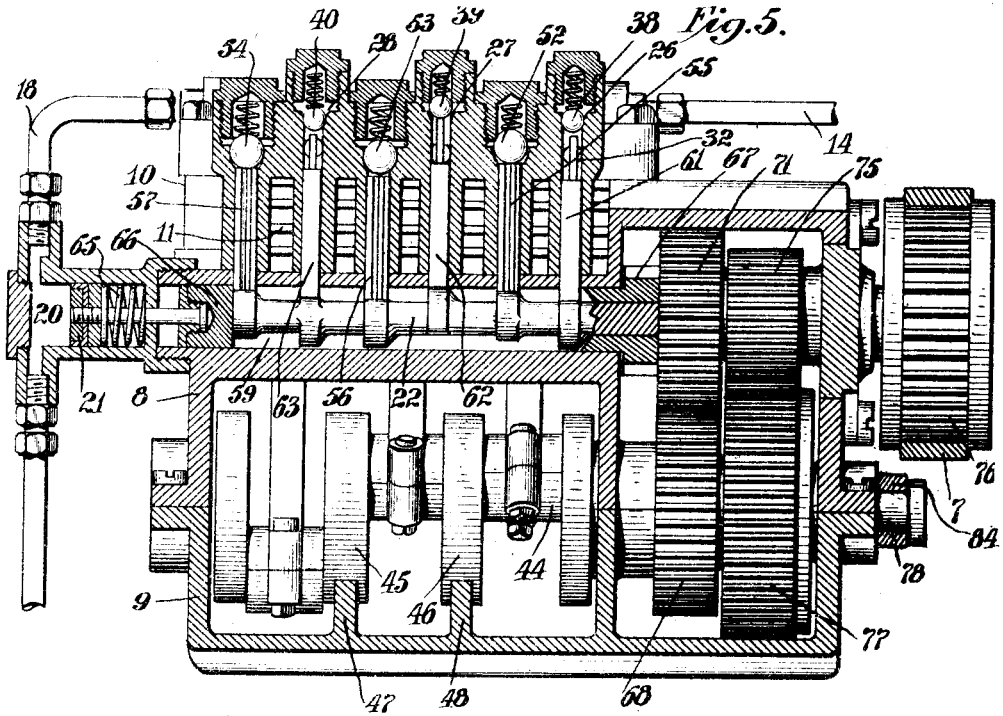
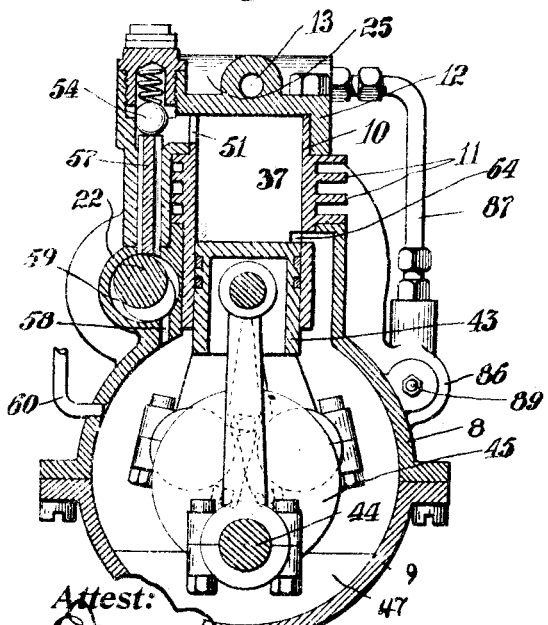
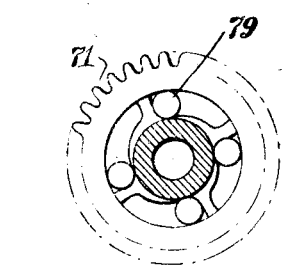
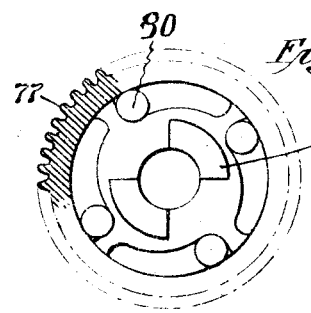
Attest:
J. C. Mitchell
K. Kreppmer
Inventor:
Walter H. Shimpf
by H. H. Barker
Atty

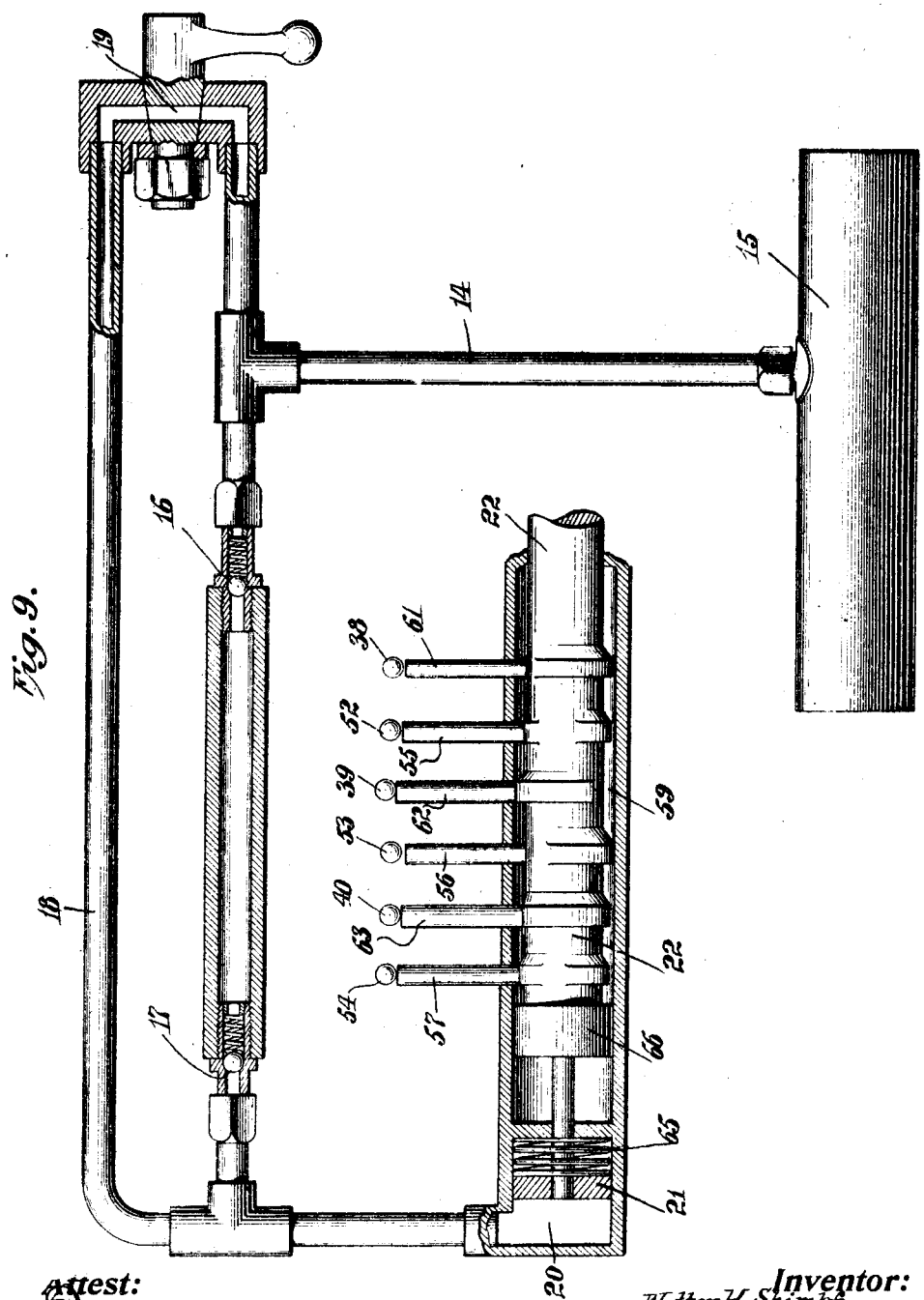

UNITED STATES PATENT OFFICE.

WALTER H. SHIMPF, OF NEW YORK, N. Y., ASSIGNOR TO SHIMPF STARTER COMPANY, OF BOSTON, MASSACHUSETTS, A CORPORATION OF MASSACHUSETTS.

STARTING-MOTOR AND COMPRESSOR.

1,120,337.   Specification of Letters Patent.   Patented Dec. 8, 1914.

Application filed November 4, 1912. Serial No. 729,450.

*To all whom it may concern:*

Be it known that I, WALTER H. SHIMPF, a citizen of the United States, and a resident of New York, in the county of New York and State of New York, have invented certain new and useful Improvements in Starting-Motors and Compressors, of which the following is a description.

The invention, as indicated, by its title, relates to a combined motor and compressor, that is, a device which under certain adjustment, will act as a motor or prime mover and under a different adjustment, would act as a compressor for compressing a fluid, the compressed force of which may be thereafter utilized for various purposes including the operating of the device as a motor.

The objects of the invention are to provide a condensed and complete unit which will be self-contained and which by adjustment, either manually or automatically, will operate as a driving motor or as a compressor.

A further object is to provide a device wherein the valves may be instantly set in operation with reference to the cylinders for transforming the device from a motor to a compressor or vice versa.

It is also an object of the invention to provide a cam shaft automatically actuated, though under the control of the user, for varying the action of the valves and to further provide automatic means for controlling the effective operation of the device wherein it may be driven as a compressor or will drive as a motor or will run idle.

Figure 1:
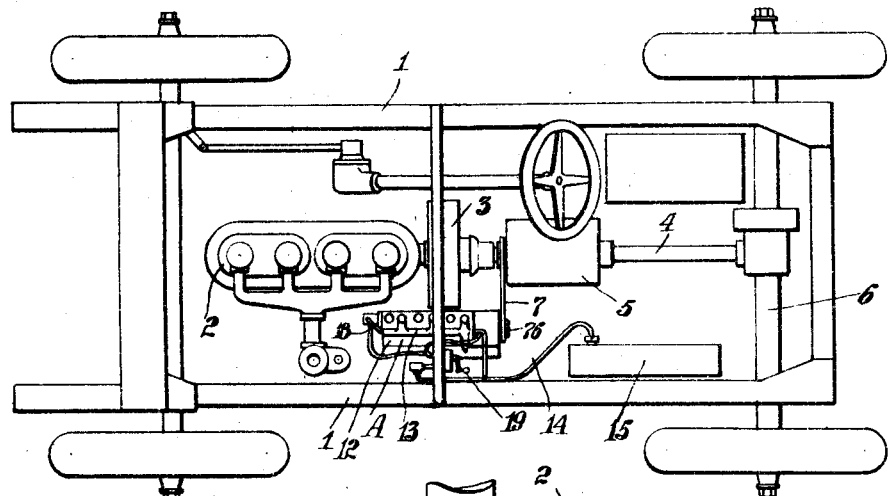
Figure 2:
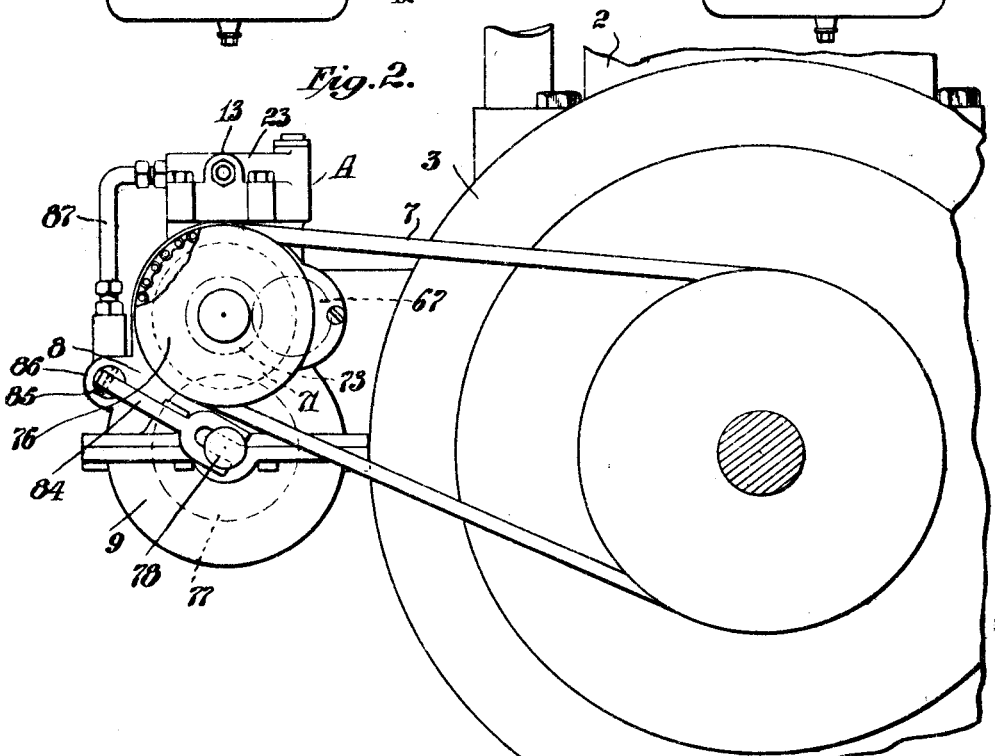
Figure 3:
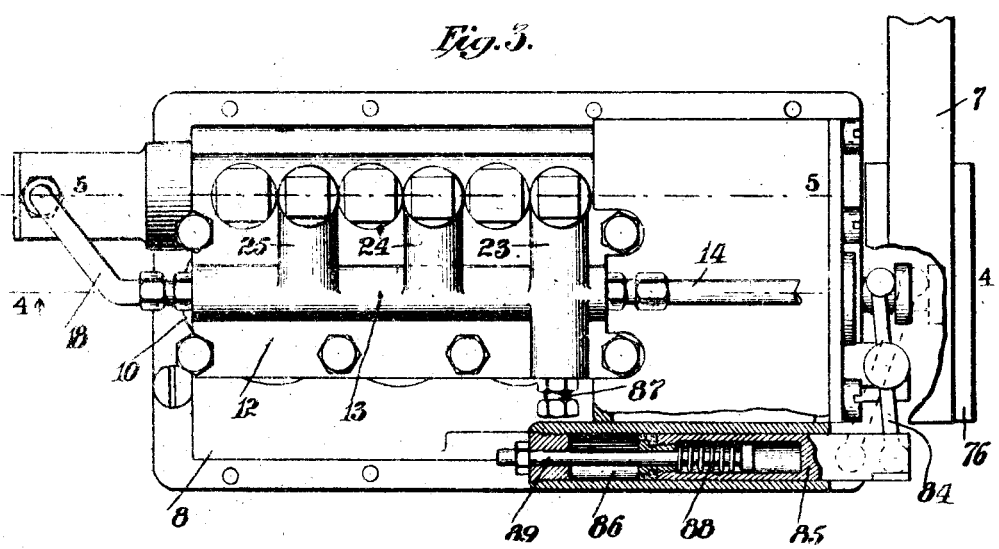
Figure 4:
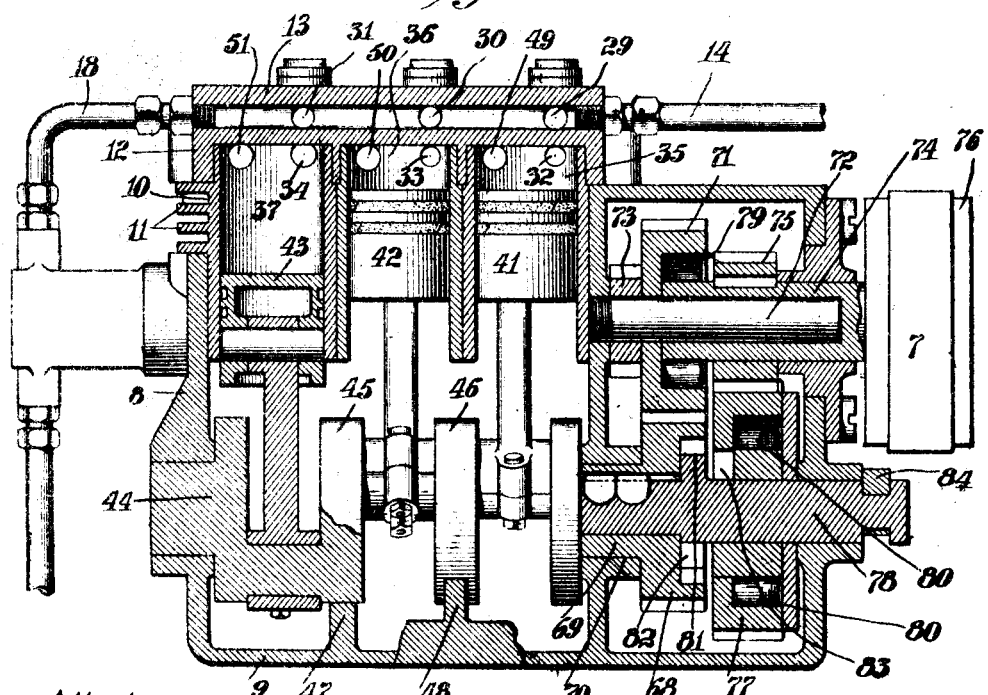

Referring to the drawings: Figure 1 is a diagrammatic view illustrative of an application of the device to an automobile chassis. Fig. 2 is a detail front elevation on enlarged scale showing the relative location of the device with reference to a gas engine and the connections therefor. Fig. 3 is a top plan view of the device on enlarged scale with parts broken away to show construction. Fig. 4 is a sectional view on the lines 4—4 of Fig. 3. Fig. 5 is a sectional view on the line 5—5 of Fig. 3. Fig. 6 is a cross sectional view through one of the cylinders and motor valves. Fig. 7 is a view of the gears of the cam shaft illustrating the clutch mechanism appurtenant thereto. Fig. 8 is a similar view of the gear of the main shaft illustrating the automatic clutch and the female member of a positive clutch. Fig. 9 is a diagrammatic view illustrating the connections for controlling the apparatus.

The device, while not limited to its exact use, is herein illustrated and described in connection with an engine of the liquid hydro-carbon type such as used on automobiles. In this connection, it is particularly efficacious as all of its various functions are brought into operation. Obviously, it may be used wherever it is desired to produce stored energy by compression and thereafter utilize said energy through a motor. When used in connection with an automobile engine, it is directly connected with some moving part of the engine, preferably its main shaft and through a system of gearing hereinafter defined and a system of clutches which is herein illustrated as automatic in its action, will either drive the engine for the purpose of starting it or will be driven by the engine for the purpose of compressing fluid into a receiving tank or will run idle, acting neither as a motor nor a compressor.

As illustrated in Fig. 1, the chassis 1 has mounted upon it, in the usual manner, driving engine 2 provided with fly wheel 3, main shaft 4, change gear 5 and rear driving axle 6. Suitably arranged upon the chassis frame is a motor and compressor A, which, as illustrated, is, through a silent chain 7, connected to the main shaft of the engine just at the rear of the fly wheel 3.

A still further object is to provide a simple acting device in which by the shifting of the cam shaft the various cylinders will act directly as compressors or as driving pistons utilizing the same valves dependent upon whether said valves are actuated by the cam shaft or are actuated automatically.

The point of connection between the combined motor and compressor and engine shaft is, of course, immaterial so long as such connection insures the proper driving effect from the motor and compressor A to the engine and from the engine to the motor and compressor. The combined motor and compressor A is what might well be termed a single acting motor and a multiple compressor inasmuch as the various pistons receive an impulse of movement from the compressed fluid, exhaust at the end of the stroke and discharge the contents of the cylinders during the return stroke without working against the compressed fluid; and at the same time when acting as compressors, compress as individual pistons. The number and arrangement of cylinders and pistons is not an essential of the invention but for convenience in illustration, three cylinders are illustrated with appurtenant parts.

The engine and compressor $a$ has its parts arranged in a casing having a main section 8 and a crank case section 9 with a cylinder section 10 suitably mounted upon the main section 8 and with the cylinders provided with air-cooling flanges 11. A head 12 is suitably secured over the cylinders and is provided with a manifold 13, which, at one end, has a connection 14 directly to a compression tank 15 through a check-valve 16 and at the opposite end is suitably connected through a check valve 17 through a duct 18 with the main controlling valve 19 and also with a chamber 20 containing a piston 21 which actuates the cam shaft 22 of the motor and compressor.

The manifold 13 is directly connected through extensions 23, 24, 25 with valve chambers 26, 27, 28, which chambers have ports 29, 30, 31 opening into the manifold and cylinder ports 32, 33, 34 opening into the respective cylinders 35, 36, 37. Ball valves 38, 39, 40, resiliently held to their seats by springs arranged under suitable adjustable caps control the passage of fluid through the valve chambers to and from the ports 29 to 31 inclusive and the ports 32 to 34 inclusive.

Each of the cylinders 35, 36, and 37 has a piston 41, 42, 43, which, through suitable connecting rods, drive the main shaft 44. This main shaft, for convenience, is provided at opposite ends with bearings of suitable length and at each intermediate point with disks 45, 46, which have a bearing in up-raised saddles 47, 48, formed in the lower half of the crank case. These saddle bearings prevent springing of the shaft under heavy duty.

In addition to the ports 32, 33, and 34 for the cylinders 35, 36, 37, there are also a series of ports 49, 50, 51, which are controlled by ball valves 52, 53, 54, said valves co-operating with the ball valves 38, 39, 40, when the device is operating as a motor and serving to release the pressure on the idle up-stroke of the pistons. These valves are controlled by grooved spindles 55, 56, 57 and when raised from their seats, permit passage of fluid from the various cylinders through said grooves into the crank case through port openings 58, connecting from the cam shaft chamber 59 to the crank case. The crank case is provided with a vent 60, which permits ready ingress and egress of air so that the cylinders may receive a charge of air at atmospheric pressure for compression purposes or may exhaust to atmospheric pressure. There is a special advantage in this particular arrangement inasmuch as lubrication of the parts is enhanced by the passage of air back and forth through the crank case and moving parts thus tending to keep the parts cool and carrying with each impulse a sufficient quantity of lubrication to said moving parts.

When the device is operating as a motor driven by the pressure of the tank 15, the various valves 38, 39, 40 and 52, 53, 54 are controlled in their lifting movements by the valve rods 55, 56, 57 and the valve rods 61, 62, 63. The valve rods 61 to 63 inclusive are reduced at their upper ends so that there is a free air passage from the ports 32, 33, 34 to the ports 29, 30, 31, whenever the ball valves 38, 39, 40 are lifted from their seats.

It is obvious in the arrangement of parts that whenever the valve 19 is in a position illustrated in Fig. 9, the air pressure from the tank 15 will be effective upon the piston 21 and will move the cam shaft 22 axially until its various cams come under the several valve rods. Thereupon at proper intervals, the valves 38, 39, and 40 will be raised to give a driving impulse to the respective pistons 41, 42, 43 which at the end of their down-strokes exhaust through ports 64. Any pressure induced by the return movement of the pistons is relieved by the opening of the valves 52, 53, 54 which permit an exhaust through the grooved valve rods, cam shaft chamber 59 and ports 58.

Whenever the device is changed from a motor to a compressor as is the case when the valve 19 is turned in its opposite position, the cylinders will receive their charge of air at atmospheric pressure through the ports 64 connecting with the crank case and vents 60 and upon their upward or working stroke will compress the fluid, driving it through the ports 32, 33, 34 and 29, 30 and 31 into the manifold and to the tank 15 past the check valve 16. During this operation, the exhaust valves 52, 53, 54 are seated, as of course the cam shaft upon release of pressure in the chamber 20, will be moved axially as by the compression spring 65 until all of the valve rods are relieved from the action of their respective cams and become inactive. It is to be noted that the cranks of the main shaft 44 are arranged substantially 120° apart.

It will be seen from the above that a single cam shaft dependent upon its position actuates all of the valves when the device is operated as a motor or becomes inactive with respect to all of said valves when the device operates as a compressor. Nevertheless, one series of valves operates automatically when the cylinders are compressing.

The cam shaft 22 rotates freely without reference to the piston 21 in a bearing 66 formed at one end of the shaft and extends into a pinion 67 at the opposite end, which pinion has a suitable bearing and is secured to the cam shaft. Thus, the cam shaft through a system of gearing hereinafter described is constantly rotated in definite relation to the main shaft 44.

The gearing which forms a drive from the motor and compressor to the engine and from the engine to the motor and compressor may be defined as follows: The main shaft 44 has arranged upon or in continuation of it a gear 68, provided with an extended hub 69 which has a bearing in the casing as at 70. This gear 68 is in constant mesh with a gear 71 carried upon a stud 72 and fast with relation to a pinion 73 which meshes with the pinion 67. A sleeve 74 is also mounted upon the stud 72 and has keyed to it a pinion 75. It also bears a main driving gear 76 which, through the silent chain 7, is connected with the main shaft 4 of the engine 2. The pinion 75 keyed to the sleeve 74 meshes with a gear 77 carried upon a shiftable clutch shaft 78 to which is keyed the pinion 68. The shiftable clutch shaft 78 is really a continuation of the crank shaft. It has a bearing at its outer end in the casing and at its inner end projects through the central bore of the gear 68 and its extended hub 69. A key and key-way intermediate the shaft-section 78 and gear 68 causes said shaft to rotate in unison with the crank shaft although permitting an axial movement of the shaft 78. The construction illustrated with the gear 68 formed integral with the crank shaft and having a central bore within which is keyed the end of the shaft 78 provides an admirable construction, in which to all purposes and intents the shiftable clutch shaft 78 is a continuation of the crank shaft.

A roller clutch 79 is arranged between the gear 71 and its sleeve 74 and a similar roller clutch 80 is arranged between the gear 77 and the shiftable clutch shaft 78. The clutch shaft 78 has a clutch member 81 which in one position lies within a recess 82 in the gear 68 and in its opposite position positively engages a clutch opening 83 in the gear 77. The clutch shaft 78 has a sliding key engagement with the gear 68 and is controlled as to its position by a lever 84, one end of which is connected with the clutch shaft 78, while the opposite end is connected to a plunger 85. This plunger or piston is arranged in a cylinder 86, which has a duct 87 connecting it with the manifold 13. The purpose and function of the piston 85 connecting lever 84 and shiftable clutch shaft 78 is to release the motor and compressor A from the driving action of the engine as soon as a definite pressure has been secured in the pressure tank when the device is actuated as a compressor.

The piston 85 whenever the pressure arrives at a predetermined point will be moved forward against the tension of the spring 88, the tension of which is made adjustable through a rod 89 and the position of the clutch shaft will be that illustrated in Figs. 3 and 4. As soon as the pressure in the manifold has dropped from its predetermined point, the spring 88 retracts the piston 85 throwing the clutch shaft into the position illustrated in dotted outlines in Fig. 3, whereupon the positive clutch 81 will be engaged with the gear 77.

When the device is operating as a motor, the main shaft 44, through the gear 68, fast on or integral therewith and driving through the gear 71 will, through the roller clutch 79, drive the sleeve 74 and gear 76. Thence through the silent chain 7, the shaft of the main engine will be turned. The main engine shaft will be driven until the engine has picked up through its own ignition and gas supply and attained a speed greater than that of the motor and compressor. Thereupon through the silent chain 7, the gear 76, pinion 75, fast upon the sleeve 74, gear 77, roller clutch 80 and shaft 78, the main shaft 44 will be driven, the device acting as a compressor. This driving movement will continue until the pressure in the manifold is sufficient to shift the piston 85 into the position illustrated in Figs. 3 and 4.

It will be seen from the above description that the device either operates as a motor to drive the engine or will be driven by the engine. Whereupon it becomes a compressor and upon a certain degree of compression will be automatically cut out, thereafter, with its gears running idle and with no movement of the pistons. The whole operation is thus made automatic and a single device with its valves is operative either as a motor or compressor dependent upon the position of its cam shaft. This cam shaft is of course controlled by the operator through the valve 19 which is preferably arranged upon the dash of the vehicle provided the device is used for starting an automobile engine. Obviously, the pressure induced in the tank 15 may be used for any purpose for which compressed fluid is adaptable and with the device connected directly with an engine, the source of supply of compressed fluid in the tank 15 is always maintained.

Obviously, the exact details of the device and exact arrangement of valves, etc., might be modified to a considerable extent as might also the gearing and controlling devices without departing from the spirit or intent of the invention which contemplates broadly a single device having one or more cylinders which will operate as a motor or as a compressor utilizing valves which, under the action of a cam shaft, coöperate as inlet and exhaust valves and yet permit compression actions of the pistons.

What I claim as my invention and desire to secure by Letters Patent is:

1. A combined motor and compressor having a cylinder, piston and main shaft, mechanically operated inlet and exhaust valves for said cylinder, one of said valves having an automatic actuation independent of its mechanical operation, a single shiftable cam shaft common to both of said valves and adapted to actuate said valves during the operation of the piston as a motor and inoperative with reference to said valves when the device is operating as a compressor and means for moving said cam shaft.

2. A combined motor and compressor having a cylinder, piston and main shaft, mechanically operated inlet and exhaust valves for said cylinder, a single cam shaft common to said valves for actuating them during the operation of the piston as a motor and inoperative with reference thereto when the device is operating as a compressor, automatic control for one of said valves during the compression actions of the piston, an inlet port controlled by the piston and means for moving the cam shaft into and out of actuating position with the valves.

3. A combined motor and compressor having a plurality of cylinders each having a piston connected with a main crank shaft, a manifold connecting the various cylinders, an inlet valve arranged between each of said cylinders and the manifold, said valve mechanically operated during the operation of the device as a motor and automatically operated during the compression movements of the pistons, exhaust valves for each cylinder mechanically controlled and operatively arranged with reference to the inlet valves, a single shiftable cam shaft common to both the inlet and exhaust valves for providing actuation thereof as a motor and inoperative with reference to all of said valves during the operation as a compressor and pneumatic connections for controlling at will the position of said cam shaft and its operation with reference to the valves.

4. In a device of the character described comprising a plurality of cylinders each having a piston with a connecting rod operatively arranged with reference to a crank shaft, a manifold connecting the various cylinders, a compression reservoir, a check valve at each end of the manifold, a shiftable cam shaft, pneumatic means for moving said shaft, pneumatic connections intermediate the reservoir and said pneumatic means, an inlet valve controlling a passage from each cylinder to the manifold and having mechanical and automatic operations and an exhaust valve for each cylinder controlled by the cam shaft.

5. A combined motor and compressor embodying a cylinder, piston and main crank shaft, an inlet valve mechanically operated during the operation of the piston as a driving piston and automatically actuated during the operation of the piston as a compressor, an exhaust valve mechanically actuated during the mechanical operation of the inlet valve and inoperative during the automatic operation of the inlet valve while the piston is acting as a compressor and a single cam shaft common to said valves and shiftable into operative and inoperative positions with reference to both of said valves.

6. A combined motor and compressor having a plurality of cylinders, each provided with an inlet and exhaust valve, pneumatic means for varying the operation of said valves and changing the action of the pistons from driving pistons to compressing pistons, a main crank shaft, a secondary shaft, gears intermediate said shafts, and clutch devices for varying the gear connections whereby the combined motor and compressor will drive the secondary shaft or be driven thereby.

7. A combined motor and compressor having a plurality of cylinders, each provided with an inlet and exhaust valve, pneumatic means for varying the operation of said valves and changing the action of the pistons from driving pistons to compressing pistons, a main crank shaft, a secondary shaft, gears intermediate said shafts, and clutch devices for varying the gear connections whereby the combined motor and compressor will drive the secondary shaft or be driven thereby as a compressor, and an automatically controlled clutch for disconnecting the gearing intermediate the crank shaft and secondary shaft whereupon the pistons will act neither as driving nor compression pistons.

8. In a device of the character described having driving and compression pistons, connecting rods and a crank shaft having a shiftable clutch shaft in extension thereof, a secondary shaft, a gear on said shaft, a gear fast upon the crank shaft and having a sliding key connection with the shiftable clutch shaft extension of the crank shaft, a gear loosely mounted with reference to the secondary shaft, an automatic roller clutch intermediate said gear and secondary shaft, a pinion fixed upon said secondary shaft, a gear meshing therewith and having an automatic roller clutch connection with the main shaft and a positive clutch intermediate the main shaft and said last-named gear.

9. In a device of the character described having driving and compression pistons, connecting rods and a crank shaft having an extended shiftable clutch shaft, a secondary shaft, a gear on said shaft, a gear fast with reference to the crank shaft and having a sliding key connection with the extended shiftable clutch shaft of the crank shaft, an automatic roller clutch intermediate said gear and secondary shaft, a pinion fixed upon said secondary shaft, a gear meshing therewith and having an automatic roller clutch connection with the shiftable clutch shaft, a positive clutch intermediate the shiftable clutch shaft and said last-named gear, and an automatic means for shifting said positive clutch.

10. A combined motor and compressor having a plurality of cylinders each provided with an inlet and exhaust valve, pneumatic means for varying the operation of said valves to change the action of the pistons from driving pistons to compression pistons, a main crank shaft, a secondary shaft, gears intermediate said shafts, a clutch operatively arranged with reference to said gears and automatic pneumatic means for controlling said clutch and gears at predetermined pressures.

11. In a device of the character described, comprising a plurality of cylinders, each provided with inlet and exhaust valves whereby said cylinders act either as motor or compression cylinders, a crank shaft, a single cam shaft controlling the inlet and exhaust valves, pneumatic means for varying the position of said cam shaft and its operative effect upon the valves, a secondary shaft, gearing intermediate the crank shaft and secondary shaft whereby said secondary shaft acts as a driving or driven shaft with reference to the crank shaft, a clutch device interposed in said gearing and automatic pneumatic means for shifting said clutch upon predetermined pressures developed by the cylinders when acting as compression cylinders.

12. In a device of the character described, comprising a plurality of cylinders each having a piston and connecting rod operatively arranged with reference to a crank shaft and with inlet and exhaust valves variably controlled, from a single cam shaft, depending upon the actuation of said pistons either as motor or compression pistons, a gear fast with reference to the crank shaft, a secondary shaft, a shiftable clutch shaft bearing a clutch and having a sliding engagement with said gear, gearing intermediate said gear and the cam shaft, gearing intermediate the clutch shaft and secondary shaft and automatic means for shifting said clutch shaft.

13. A combined motor and compressor having a plurality of cylinders, each provided with an inlet and exhaust valve, manual means for varying the operation of said valves and changing the action of the pistons from driving pistons to compression pistons, a main crank shaft, a secondary shaft, gears intermediate said shafts, and clutch devices for varying the gear connections whereby the combined motor and compressor will drive the secondary shaft or be driven thereby as a compressor.

14. A combined motor and compressor having a plurality of cylinders, each provided with an inlet and exhaust valve, a single cam shaft controlling the operation of said inlet and exhaust valves, means for varying the action of the cam shaft with reference to said valves whereby the action of said pistons may be changed from driving pistons to compression pistons, a main crank shaft, a secondary shaft, gears intermediate said shafts, connections intermediate said secondary shaft and cam shaft and clutch devices for varying the gear connections whereby the combined motor and compressor will drive the secondary shaft or be driven thereby as a compressor.

15. In a combined motor and compressor having a plurality of cylinders, pistons and a common crank shaft, valves controlling the inlet and exhaust ports for said cylinders, a cam shaft common to all of said valves, passages extending from the cam shaft to the valve seats, actuating valve rods arranged in said passages and adapted to actuate the valves as they are moved by the cam shaft, the valve rods for the inlet valves closing the passages and acting as sealing valves therefor, and the valve rods for the exhaust valves being grooved to provide exhaust passages.

16. A combined motor and compressor, having a plurality of cylinders, a manifold common to said cylinders, a valve controlled passage intermediate the manifold and each of said cylinders, said air passages extending into a cam shaft chamber, a cam shaft chamber and cams for operating the valves, valve rods controlling said air passages and adapted upon reciprocation to actuate the valves.

17. A combined motor and compressor, having a plurality of cylinders, a manifold common to said cylinders, a cam shaft chamber, a cam shaft mounted therein, air passages intermediate the manifold, cam shaft chamber and each of the cylinders, a reciprocating valve member controlling the passages to the cam shaft chamber, valves controlling the passage from the manifold to each of the cylinders, said valves arranged to be actuated by the reciprocating valve member and cam shaft.

WALTER H. SHIMPF.

Witnesses:
Wm. P. Hill.
Karl Brunner.